Nov. 5, 1963    W. S. ELLIOTT    3,109,992
TEMPERATURE-STABILIZED AND DISTORTIONLESS DIODE DETECTOR
Original Filed Jan. 23, 1958
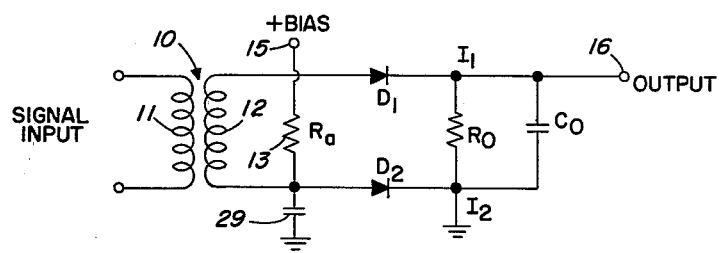
FIG 1
FIG 2
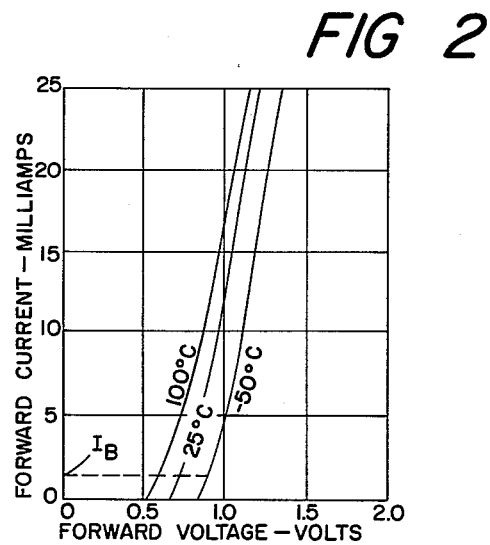
INVENTOR.
WILLIAM S. ELLIOTT
BY
ATTORNEY United States Patent Office 3,109,992
Patented Nov. 5, 1963

3,109,992
TEMPERATURE-STABILIZED AND DISTORTION-
LESS DIODE DETECTOR
William S. Elliott, Cedar Rapids, Iowa, assignor to Collins
Radio Company, Cedar Rapids, Iowa, a corporation of
Iowa
Original application Jan. 23, 1958, Ser. No. 710,821, now
Patent No. 3,079,562, dated Feb. 26, 1963. Divided
and this application Dec. 26, 1961, Ser. No. 162,284
3 Claims. (Cl. 329—178)

This invention relates to semiconductor detectors, and constitutes a division of pending United States patent application Serial Number 710,821, filed January 23, 1958, now Patent No. 3,079,562.

Some types of semiconductor diodes and transistors have relatively large gap potentials caused by the atomic structure of the material from which they are made. Silicon diodes and transistors have, for example, substantial gap potentials of the order of 0.6 volt, which furthermore is highly variable with temperature and may range from 0.5 to 0.8 volt over a temperature variation of plus or minus 75° C.

It is therefore an object of this invention to provide a low-signal-level detector circuit capable of using large-gap-potential semiconductors while being stabilized with respect to temperature variation.

It is another object of this invention to provide a detector circuit capable of using large-gap-potential semiconductors without distorting a detected low-level signal that is amplitude modulated to nearly 100%.

The energy-gap-potential of a semiconductor detector distorts a detected signal when it clips portions of the modulation envelope of the received signal that dip below the energy-gap-potential level. Such clipping distortion is particularly objectionable in conventional detectors which receive low input-signal levels.

The invention is constructed with a pair of similar semiconductor diodes. One said diode is connected to ground while the other is connected to ground through a filtering capacitor and a resistor connected in parallel therewith. Opposite ends of a transformer secondary connect to the other electrodes which are the same type. The transformer primary receives a signal to be detected. The opposite electrode of the grounded diode is connected to a bias source which biases it to a voltage slightly greater than its energy-gap potential.

Further objects, features and advantages of the invention will be apparent to a person skilled in the art upon further study of the specification and the accompanying drawings, in which:

FIGURE 1 illustrates the detector of the invention; and
FIGURE 2 shows the energy-gap potential of silicon semiconductors and its variation with temperature.

Now referring to the drawings for a more detailed explanation of the invention, FIGURE 1 includes a pair of diodes $D_1$ and $D_2$ which are silicon diodes. Resistor $R_0$ and capacitor $C_0$ are connected between the cathode of diode $D_1$ and ground. Also, the cathode of $D_2$ is connected to ground.

A transformer 10 has its primary 11 connected to a signal source, such as to an intermediate-frequency amplifier. Its secondary 12 has opposite ends connected to the anodes of diodes $D_1$ and $D_2$. A capacitor 29 is connected between ground and a point between diode $D_2$ and secondary 12 to provide signal ground level at one end of the secondary. A positive voltage bias source, connected to a terminal 15, is connected through a resistor 13 to the anode of diode $D_2$. Resistor 13 determines a current that causes a potential drop across diode $D_2$ slightly greater than its energy-gap potential. The evaluation of resistor 13 is easily determined from curves provided by the manufacture of a particular type of diode. The potential drop provided across diode $D_2$ by the bias source is then also provided across diode $D_1$, resistor $R_0$ and the resistance of secondary 12. Thus, diode $D_1$ is biased to a lower value than $D_2$ due to the voltage drop across the resistance of secondary 12 and resistor $R_0$; but by keeping them small compared to the resistance presented by diode $D_1$, most of the bias is maintained across $D_1$.

The alternating-current axis of the signal across secondary 12 is maintained above ground potential by the drop across $D_2$ as the signal is detected by diode $D_1$ and appears at output terminal 16. Hence, a bias on diode $D_2$ higher than its gap potential is required to maintain a bias on diode $D_1$ at the gap potential. Accordingly, the incoming signal will not be clipped by gap potential. Hence, clipping distortion does not occur.

Furthermore, as the temperature changes, the gap potentials of both diodes $D_1$ and $D_2$ change together. Accordingly, the bias on them will change together, and there will be no substantial effect on the operation of the circuit due to temperature change. FIGURE 2 illustrates the change of gap potential with temperature. Resistor $R_a$ is proportioned to provide through diode $D_2$ a current $I_B$ (which is above the knee of its gap-potential characteristic). Therefore, it is seen that the same value of $I_B$ maintains approximately the same bias on diode $D_2$ regardless of the shift in gap potential caused by temperature change. Hence, the bias level on $D_1$ will remain above its gap potential regardless of temperature change.

Although this invention has been described with respect to a particular embodiment thereof, it is not to be so limited as changes and modifications may be made therein which are within the full intended scope of the invention as defined by the appended claims.

What is claimed as my invention is:

1. A temperature-stabilized detector circuit preventing clipping distortion at low signal levels of a received signal, comprising a signal-receiving transformer having a secondary, first and second diodes having common-type electrodes respectively connected to opposite ends of said secondary, means connecting the other electrode of said first diode to ground, impedance means connecting the other electrode of said second diode to ground, a low-reactance capacitor connected between ground and the first-mentioned type of electrode of said first diode, and resistance means connected between the first-mentioned type of electrode of said first diode and a bias source having a polarity to enable said diodes to produce a detected output in response to signals coupled thereto from said transformer.

2. A detector circuit as defined in claim 1 in which said first-mentioned type of electrode is the anode, and said bias source provides a positive potential.

3. A temperature-stabilized detector circuit comprising first and second diodes having common-type electrodes adapted to receive an input signal with the instantaneous polarity of said received signal at said first diode opposite that at said second diode, means connecting the other electrode of said first diode to ground, impedance means connecting the other electrode of said second diode to ground, a low-reactance capacitor connected between ground and the first-mentioned type of electrode of said first diode, and first and second resistance means, said first resistance means being connected between the first-mentioned type of electrode of said first diode and a bias source and said first and second resistance means being serially connected between the first-mentioned type of electrode of said second diode and said bias source, said bias source having a polarity to enable said diodes to provide a detected output in response to a received input signal.

References Cited in the file of this patent

UNITED STATES PATENTS 2,227,906     Kellogg ---------------- Jan. 7, 1941